(12) United States Patent
Kumagai (10) Patent No.: US 12,337,673 B2
(45) Date of Patent: Jun. 24, 2025

(54) SUPPORT APPARATUS FOR BATTERY PACK AND ELECTRIC TRUCK

(71) Applicant: Daimler Truck AG, Leinfelden-Echterdingen (DE)

(72) Inventor: Naotatsu Kumagai, Kawasaki (JP)

(73) Assignee: Daimler Truck AG, Leinfelden-Echterdingen (DE)

(*) Notice: Subject to any disclaimer, the term of this patent is extended or adjusted under 35 U.S.C. 154(b) by 336 days.

(21) Appl. No.: 18/248,341

(22) PCT Filed: Aug. 27, 2021

(86) PCT No.: PCT/JP2021/031463
§ 371 (c)(1),
(2) Date: Apr. 7, 2023

(87) PCT Pub. No.: WO2022/074954
PCT Pub. Date: Apr. 14, 2022

(65) Prior Publication Data
US 2023/0373287 A1    Nov. 23, 2023

(30) Foreign Application Priority Data
Oct. 9, 2020  (JP) .................................. 2020-171501

(51) Int. Cl.
*B60K 1/04* (2019.01)
*B60L 50/60* (2019.01)
(Continued)

(52) U.S. Cl.
CPC ............... *B60K 1/04* (2013.01); *B60L 50/66* (2019.02); *B60L 53/16* (2019.02); *B62D 21/02* (2013.01);
(Continued)

(58) Field of Classification Search
CPC .... B60K 2001/0438; B60K 2001/0444; B60K 2001/0472
See application file for complete search history.

(56) References Cited

U.S. PATENT DOCUMENTS 11,021,070 B2 * 6/2021 Miyoshi .............. H01M 50/249
11,345,331 B2 * 5/2022 McKibben ............. B60K 15/03
(Continued)

FOREIGN PATENT DOCUMENTS

CN         102582457 A    7/2012
CN         103779514 A    5/2014
(Continued)

OTHER PUBLICATIONS

PCT/JP2021/031463, International Preliminary Report on Patentability (PCT/IB/373) and Written Opinion (PCT/ISA/237) dated Mar. 28, 2023 (Five (5) pages).
(Continued)

*Primary Examiner* — Erez Gurari
(74) *Attorney, Agent, or Firm* — Crowell & Moring LLP (57) ABSTRACT

A support apparatus for a battery pack being mounted under side rails constituting a ladder frame of a vehicle and including a pair of side faces, the side faces facing outward in a vehicle width direction. The support apparatus has a battery-side bracket that includes an opposing face facing the side face and accommodates the battery pack and a frame-side bracket coupling the battery-side bracket to the side rail. The battery-side bracket has a device mounting unit for mounting an on-board device at an outer face opposite to the opposing face.

8 Claims, 4 Drawing Sheets

(51) Int. Cl.
  *B60L 53/16* (2019.01)
  *B62D 21/02* (2006.01)
  *H01M 50/249* (2021.01)
  *H01M 50/262* (2021.01)
(52) U.S. Cl.
  CPC ....... *H01M 50/249* (2021.01); *H01M 50/262* (2021.01); *B60K 2001/0438* (2013.01); *B60L 2200/36* (2013.01); *H01M 2220/20* (2013.01)

(56) References Cited

U.S. PATENT DOCUMENTS

| | | | | |
|---|---|---|---|---|
| 11,820,241 B2* | 11/2023 | Borghi | .................... | B60L 50/66 |
| 12,194,830 B2* | 1/2025 | Andersson | .......... | H01M 50/249 |
| 12,286,005 B2* | 4/2025 | Hörder | ................ | H01M 50/204 |
| 2020/0259143 A1* | 8/2020 | Sloan | .................. | H01M 50/262 |
| 2020/0331536 A1* | 10/2020 | Sloan | ........................ | B60K 1/04 |
| 2022/0111716 A1* | 4/2022 | McKibben | ............. | B60L 50/62 |
| 2022/0111717 A1* | 4/2022 | Hendriks | ................ | B60L 50/66 |
| 2022/0410686 A1* | 12/2022 | Kumagai | ................ | B60K 1/04 |
| 2023/0158880 A1* | 5/2023 | Ragot | .................. | B62D 21/155 |
| | | | | 180/68.5 |
| 2023/0173904 A1* | 6/2023 | Ragot | ................ | H01M 50/262 |
| | | | | 180/68.5 |
| 2023/0373287 A1* | 11/2023 | Kumagai | ............... | B60L 50/64 |
| 2024/0001991 A1* | 1/2024 | Cochrane | ................ | B62D 21/152 |
| 2024/0010078 A1* | 1/2024 | Kumagai | .................. | B60L 1/00 |
| 2024/0149654 A1* | 5/2024 | Kvalden | ............... | B60L 3/0007 |
| 2024/0166060 A1* | 5/2024 | Tyerman | ............. | H01M 50/242 |
| 2024/0286480 A1* | 8/2024 | Kumagai | ................ | B60L 50/66 |
| 2024/0308321 A1* | 9/2024 | Ragot | ................. | H01M 50/249 |

FOREIGN PATENT DOCUMENTS

| | | |
|---|---|---|
| CN | 204323022 U | 5/2015 |
| CN | 211223010 U | 8/2020 |
| DE | 10 2008 061 493 A1 | 6/2010 |
| EP | 4 368 455 A1 | 5/2024 |
| JP | 2016-113063 A | 6/2016 |
| JP | 2018-187976 A | 11/2018 |
| JP | 2019-50170 A | 3/2019 |
| WO | WO 2020/041630 A1 | 2/2020 |

OTHER PUBLICATIONS

Japanese-language Japanese Office Action issued in Japanese Application No. 2020-171501 dated Aug. 29, 2023, with English translation (8 pages).

PCT/JP2021/031463, International Search Report dated Oct. 26, 2021 (Two (2) pages).

English-language Extended European Search Report issued in European Application No. 21877257.2-1009 dated Jul. 15, 2024 (8 pages).

Japanese-language Japanese Office Action issued in Japanese Application No. 2020-171501 dated Jan. 9, 2024, with English translation (6 pages).

* cited by examiner

SUPPORT APPARATUS FOR BATTERY PACK AND ELECTRIC TRUCK

TECHNICAL FIELD

The present disclosure relates to a support apparatus that supports a battery pack for driving a vehicle, and to an electric truck provided with the support apparatus.

BACKGROUND TECHNIQUE

Conventionally, from the viewpoint of reducing environmental loads, electric vehicles, such as electric vehicles or hybrid vehicles, have been developed which travel by supplying electric power of a driving battery to a motor. In recent years, electric vehicles have also been developed in the field of commercial vehicles such as trucks (see, for example, Patent Document 1). From the aspect of cost reduction, application of a general-purpose battery pack, which has been used for a passenger vehicle, to an electric commercial vehicle has been examined.

PRIOR ART DOCUMENTS

Patent Document

[Patent Document 1] Japanese Laid-Open Patent Publication No. 2016-113063

SUMMARY OF INVENTION

Problem to be Solved by Invention

However, since a battery pack for a passenger vehicle is assumed to be mounted inside the vehicle body, the casing of the battery pack has a relatively low load bearing strength. On the other hand, since high impact load may be applied to a battery pack of a commercial vehicle such as a truck, which battery pack is arranged under the ladder frame, in the event of a side collision, the support apparatus that supports the battery pack requires a high load bearing strength.

In a typical vehicle provided with a ladder frame, space on the side (outside in the vehicle width direction) of the ladder frame between the wheelbase is used for mounting various on-board devices such as a low-voltage battery and a side sensor. In contrast to the above, in cases where a battery pack is arranged under the ladder frame, the battery pack reduces a space for mounting on-board devices, so that the mountability of such an on-board device may be lowered.

With the foregoing problems in view, one of the objects of the present disclosure is to ensure the mountability of an on-board device while enhancing the protectability of the battery pack in case of a side collision.

Means to Solve the Problem

The present disclosure has been developed in order to solve at least part of the above objects, and can be achieved in the form of the following embodiment or application example.

(1) A support apparatus for a battery pack according to this application example is for the battery pack being mounted under side rails constituting a ladder frame of a vehicle and including a pair of side faces, the side faces facing outward in a vehicle width direction and being positioned on outsides in the vehicle width direction with respect to the side rails, the support apparatus including: a battery-side bracket that includes an opposing face facing the side faces and accommodates the battery pack; and a frame-side bracket coupling the battery-side bracket to the side rails, wherein the battery-side bracket includes a device mounting unit for mounting an on-board device at an outer face opposite to the opposing face.

With this support apparatus for a battery pack, since the impact load input from the outside in the vehicle width direction in case of a side collision is input into the on-board device before being input into the battery-side bracket, the initial input of the impact load is absorbed by the on-board device. This reduces the impact load to be transmitted to the battery-side bracket, so that the impact load to be transmitted to the battery pack through the battery-side bracket is also reduced. Consequently, the protectability of the battery pack in a side collision can be enhanced.

In addition, since the presence of the device mounting unit makes it possible to mount the on-board device on the outer face of the battery-side bracket, the mountability of the on-board device can be ensured.

(2) In the support apparatus for the battery pack according to this application example, the device mounting unit may include: a weld bolt having a head portion being welded to the opposing face and a screw portion protruding from the head portion outward in the vehicle width direction further than the outer face.

The device mounting unit including the weld bolt makes it possible to mount the on-board device on the device mounting unit simply by fastening a nut to the weld bolt from the outside in the vehicle width direction. This further enhances the mountability of the on-board device.

The screw portion protruding from the head portion welded to the opposing face toward the outer side in the vehicle width direction further than the outer face has a protruding end directing outward in the vehicle width direction, and therefore the protruding end can be avoided from interfering with the battery pack. This further enhances the protectability of the battery pack in the event of a side collision.

(3) In the support apparatus according to this application example, the device mounting unit may include: a weld nut welded to the opposing face.

The device mounting unit including the weld nut makes it possible to mount the on-board device on the device mounting unit simply by fastening a weld bolt to the weld nut from the outside in the vehicle width direction. This further enhances the mountability of the on-board device.

(4) In the support apparatus according to this application example, the battery-side bracket may include a successive face being provided successively to the outer face and forming a corner portion in conjunction with the outer face; and the device mounting unit may be formed on the corner portion provided from the outer face to the successive face.

The device mounting unit formed on the corner portion provided from the outer face to the successive face of the battery-side bracket makes it possible to mount the on-board device on the corner portion having a relatively high stiffness in the battery-side bracket. With this structure, the installing strength of the on-board device to the device mounting unit can be ensured while simplifying the structure to install the on-board device to the device mounting unit.

By mounting the on-board device on the successive face as well as on the outer face of the battery-side bracket, the impact load input into the on-board device in a side collision is easily transmitted also to the successive face. This inhibits the deformation of the outer face on the collision side of the battery-side bracket, so that the protectability of the battery pack in the side collision can be further enhanced.

(5) An electric truck according to this application example includes a support apparatus for a battery pack defined in any one of the above features (1)-(4).

Like the above feature (1), this configuration can ensure the protectability of the battery pack in a side collision while enhancing the mountability of the on-board device.

(6) In the electric truck according to this application example, the on-board device may include a casing provided with a charging opening for charging the battery pack from outside.

In such an electric truck in which the casing is mounted on the device mounting unit, the charging opening of the casing can be easily arranged on the outer side in the vehicle width direction as compared with a structure that mounts the casing on the side rail. This makes it possible to arrange the casing at a predetermined position without extending a dedicated bracket for arranging the casing at the predetermined position from the side rail, so that the workability of supplying electricity to the charging opening can be ensured while reducing the number of components and simplifying the structure.

(7) In the electric truck according to this application example, the on-board device may include a sensor that detects an object being outside in the vehicle width direction.

In such an electric truck in which the sensor is mounted on the device mounting unit, the sensor can be easily arranged on the outer side in the vehicle width direction as compared with a structure that mounts the sensor on the side rail. This makes it possible to arrange the sensor at a predetermined position without extending a dedicated bracket for arranging the sensor at the predetermined position from the side rail, so that the detection area of the sensor can be appropriately set while reducing the number of components and simplifying the structure.

Effect of Invention

According to the present disclosure, the mountability of the on-board device can be ensured while enhancing the protectability of the battery pack in case of a side collision.

EMBODIMENT TO CARRY OUT INVENTION

Referring to the drawings, embodiments of the present disclosure will now be described. The following embodiments are illustrative only and are not intended to preclude the application of various modifications and techniques not explicitly set forth therein. The configurations of the following embodiments may be variously modified and implemented without departing from the scope thereof. Also, the configurations can be selected as necessary, or can be combined in an appropriate manner.

[1. Configuration]
[1-1. Overall Configuration]

Figure 1:
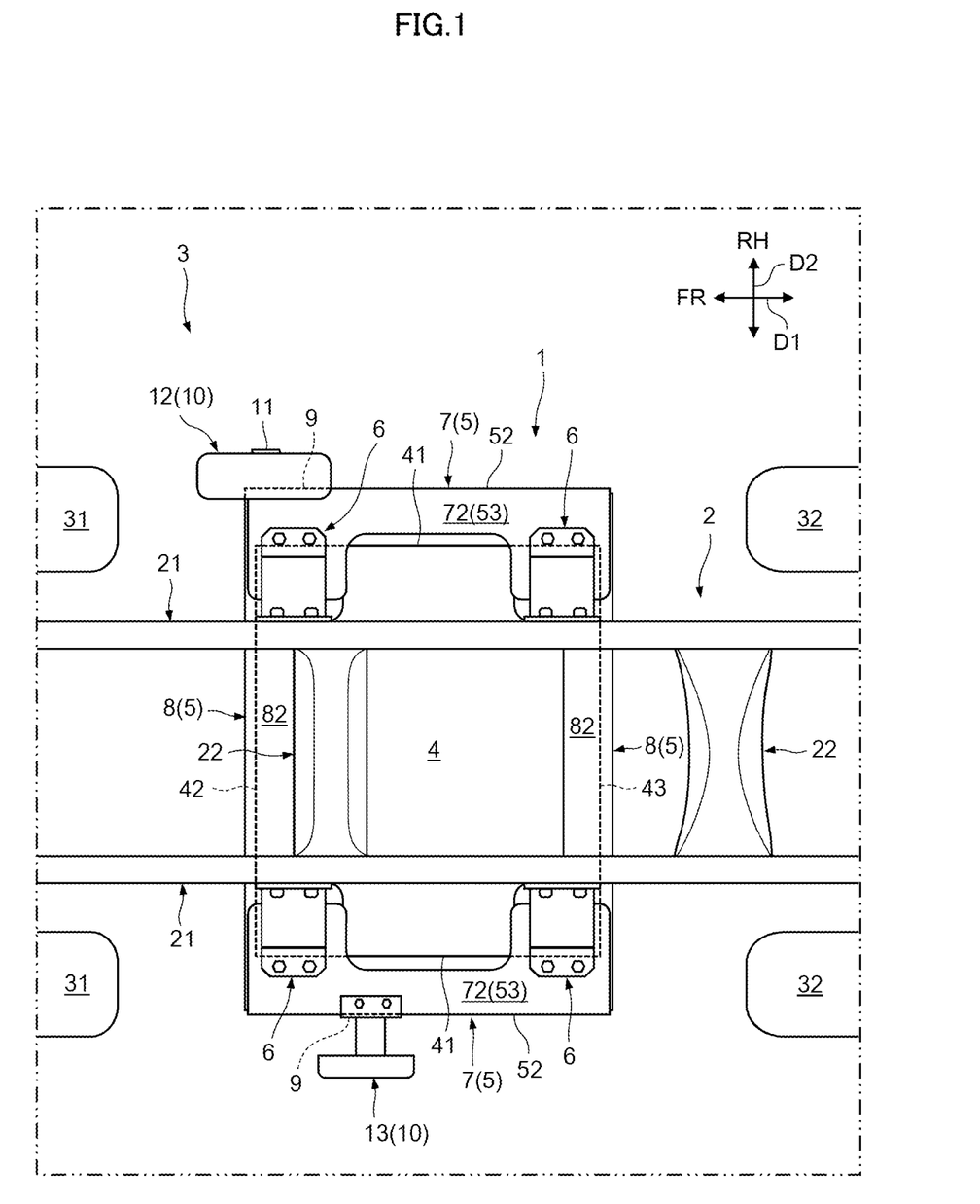
FIG. 1 is a top view of a main part of an electric truck to which a support apparatus for a battery pack according to an embodiment is applied.

As shown in FIG. 1, a support apparatus 1 for a battery pack (hereinafter, simply referred to as a support apparatus 1) according to the present embodiment is mounted on an electric truck (vehicle) 3 provided with a ladder frame 2. The electric truck 3 is an electric vehicle (electric automobile, hybrid vehicle) that travels by supplying electric power of a battery pack 4 for driving to a non-illustrated motor.

Hereinafter, the front-rear direction of the electric truck 3 is also referred to as a vehicle length direction D1, and the right-left direction of the electric truck 3 is also referred to as a vehicle width direction D2. A vertical direction orthogonal to both the front-rear direction and the left-right direction is also referred to as a vehicle height direction D3. In the drawings, the front side is indicated by "FR"; the right side is indicated by "RH"; and the upper side is indicated by "UP". Incidentally, FIG. 1 shows a lower structure of the electric truck 3, but omits the upper structure (body) disposed above the ladder frame 2.

The ladder frame 2 is a component which forms a skeleton of the electric truck 3 and has high stiffness and strength. The ladder frame 2 includes a pair of side rails 21 extending in the vehicle length direction D1, and multiple cross members 22 extending in the vehicle width direction D2 to connect the side rails 21 to each other.

The pair of side rails 21 are arranged apart from each other in the vehicle width direction D2. Each side rail 21 has a channel-like shape (U-shaped cross section) in which a pair of plate-like flange portions extend inward in the vehicle width direction D2 from the upper and the lower edges of the plate-like web portion extending along the vehicle length direction D1 and the vehicle height direction D3.

The multiple cross members 22 are disposed apart from each other in the vehicle length direction D1. Here, two cross members 22 are illustrated, which are disposed at two positions of: a position overlapping the battery pack 4 in the vehicle height direction D3; and a position to the rearward of the battery pack 4.

The battery pack 4 is, for example, a general-purpose high-voltage battery pack usable in a passenger car. In the electric truck 3, the battery pack 4 is mounted under the pair of side rails 21 and protrudes outward in the vehicle width D2 further than the side rails 21. Here, the illustrated battery pack 4 has a box shape having a dimension in the vehicle height direction D3 smaller (thinner) than the dimensions in the vehicle length direction D1 and the dimension in the vehicle width direction D2. However, the shape of the battery pack 4 is not particularly limited.

The battery pack 4 has a pair of side faces 41 (hereinafter, also referred to as battery side-faces 41) facing outward in the vehicle width direction D2. The pair of battery side-faces 41 are respectively positioned on outsides in the vehicle width direction D2 with respect to the pair of side rails 21. More specifically, the right battery side-face 41 is positioned on the right side of the right side rail 21 and the left battery side-face 41 is positioned on the left side of the left side rail 21.

Since the battery side-faces 41 are arranged outside in the vehicle width direction D2 of the side rails 21 as described above, the dimension of the battery pack 4 in the vehicle width direction D2 is reserved to be larger than the distance between the web portions of the side rails 21. Thus, the storage capacity of the battery pack 4 can be increased.

Also, the battery pack 4 is preferably arranged over a wide area of the wheelbase (the distance between the front axle and the rear axle) in order to ensure the cruising range of the electric truck 3. The present embodiment illustrates, in a relatively small electric truck 3 (having a relatively short wheelbase), an example in which one battery pack 4 is disposed over almost the entire wheelbase. Therefore, front wheels 31 are disposed close to the front of the battery pack 4, and rear wheels 32 are disposed close to the rear of the battery pack 4.

The size of the electric truck 3 and the number of battery packs 4 are not limited to those exemplified in the present embodiment. In a relatively large electric truck 3 (i.e., having a relatively long wheelbase), multiple battery packs 4 may be arranged side by side in the vehicle length direction D1. Also in this case, by arranging multiple battery packs 4 over a wide area of the wheelbase, the multiple battery packs 4 as a whole can be made to have a larger capacity and thereby ensure the cruising range.

The support apparatus 1 couples the battery pack 4 to the side rails 21 and supports the battery pack 4. In other words, the battery pack 4 is supported by the side rails 21 via the support apparatus 1. In the present embodiment, the support apparatus 1 is assumed to be configured bilaterally symmetrically with respect to the vehicle width direction D2 except for a device mounting unit 9 to be described below.

The support apparatus 1 includes a battery-side bracket 5 that accommodates the battery pack 4 and frame-side brackets 6 that couple the battery-side bracket 5 and the side rails 21 to each other. The battery-side bracket 5 is an outer wall body disposed on the outer circumference of the battery pack 4 and has a function of protecting the battery pack 4 from impact loads. On the other hand, the frame-side brackets 6 extend outward in the vehicle width direction D2 and downward from the side rails 21, and have a function of suspending the battery pack 4 accommodated in the battery-side bracket 5 from the side rails 21.

Figure 2:
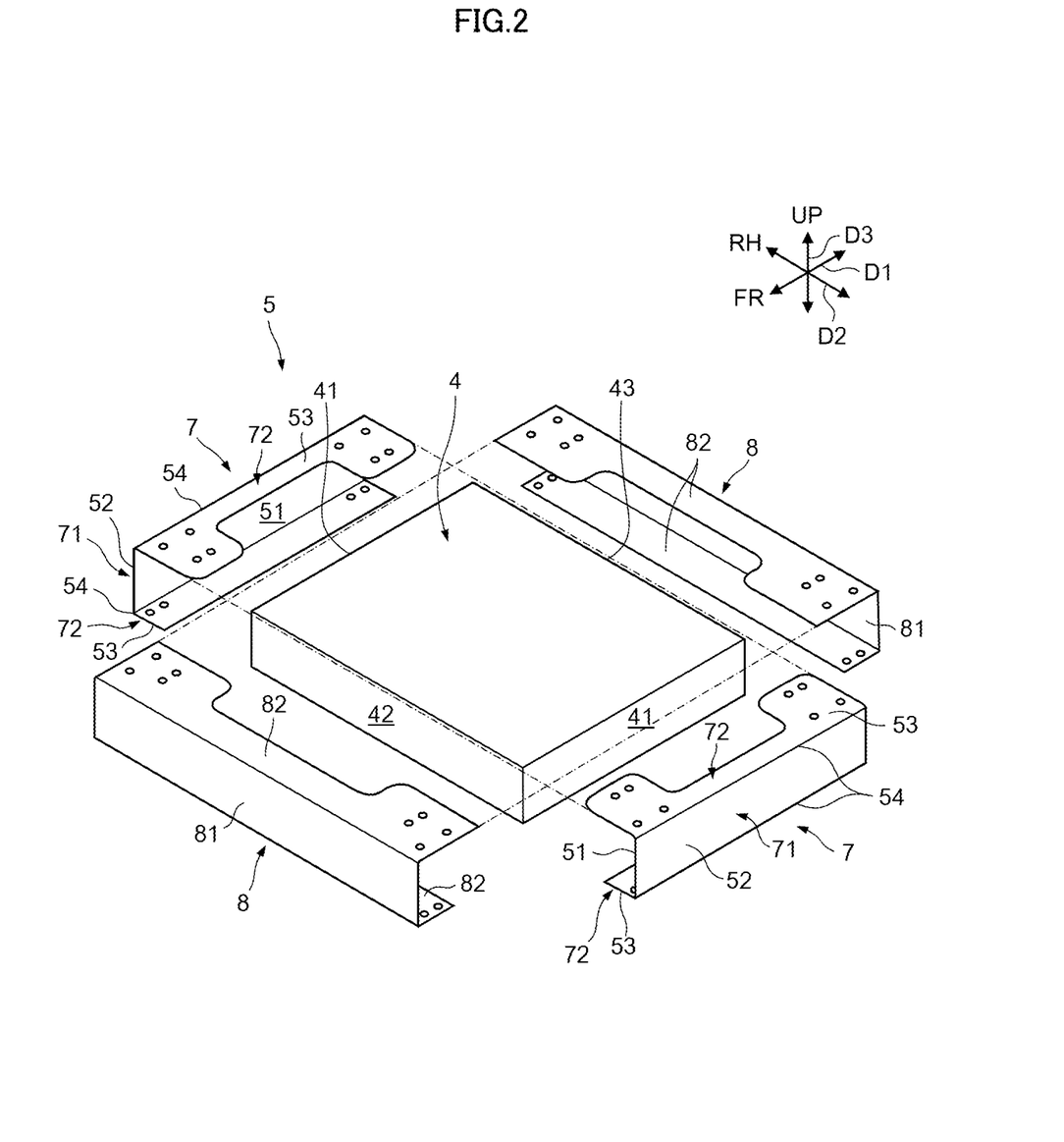
FIG. 2 is an exploded perspective view of the battery pack and a battery-side bracket applied to the electric truck of FIG. 1.

The battery-side bracket 5 of the present embodiment includes: a pair of end cross members 7 disposed on the outside in the vehicle width direction D2 (left and right) of the battery pack 4; and a pair of main members 8 disposed on the outside in the vehicle length direction D1 (front and rear) of the battery pack 4. The battery-side bracket 5 is arranged, with these end cross members 7 and the main members 8, so as to surround the four sides of the battery pack 4.

The pair of end cross members 7 are formed similarly (left-right symmetrically) to each other except for the device mounting unit 9. Likewise, the pair of main members 8 are formed similarly (front-back symmetrically) to each other. As shown in FIG. 2, both the end cross members 7 and the main members 8 of the present embodiment are formed of steel plates and formed into channel shapes. Incidentally, FIG. 2 omits illustration of the device mounting unit 9.

Each end cross member 7 has a web portion 71 arranged along the battery side-face 41 and a pair of flange portions 72 respectively protruding from the upper and the lower edges of the web portion 71 toward the battery pack 4 (inward in the vehicle width direction D2). By arranging the web portion 71 spaced from the corresponding battery side-face 41 (with a gap), each end cross members 7 of the present embodiment can reserve deformation allowance (absorbing allowance of the impact load) in the event of a possible collision.

The web portion 71 of each end cross member 7 serves as an opposing face 51 facing the battery side-face 41 and an outer face 52 on the opposite side of the opposing face 51. More specifically, the opposing face 51 is the inner face (the face facing inward in the vehicle width direction D2) of each web portion 71 of the end cross member 7, and the outer face 52 is the outer face (the face facing outward in the vehicle width direction D2) of the web portion 71 of the end cross member 7.

In the present embodiment, since the web portion 71 of each end cross member 7 is spaced apart from the battery side-face 41 as described above, the opposing face 51 is not in contact with the battery side-face 41. Alternatively, the opposing face 51 (i.e., the web portion 71 of the end cross member 7) may be arranged in contact with the battery side-face 41.

Each flange portion 72 of each end cross member 7 serves as a successive face 53 provided successively to the outer face 52 in the battery-side bracket 5. More specifically, the successive face 53 is an outer face (i.e., the face facing outward in the vehicle height direction D3) of the flange portion 72 of each end cross member 7. The successive face 53 forms a corner portion 54 in conjunction with the outer face 52. The present embodiment illustrates the upper and the lower successive faces 53 that form substantially right-angle corner portions 54 at positions corresponding to the upper and the lower edges of the outer face 52, respectively.

Each main member 8 has: a web portion 81 arranged along the front face 42 or the rear face 43 of the battery pack 4; and a pair of flange portions 82 protruding from the upper edge and the lower edge of the web portion 81 toward the battery pack 4 (i.e., inward in the vehicle length direction D1). The flange portions 82 of each main member 8 is overlaid on the battery pack 4 side (inside in the vehicle height direction D3) than the flange portions 72 of the end cross members 7, and are coupled to the flange portions 72 of the end cross members 7 by non-illustrated fasteners.

As shown in FIG. 1, the frame-side brackets 6 are fixed to portions where the upper flange portions 72 and 82 of the end cross members 7 and the main members 8 overlap. The frame-side brackets 6 are also fixed to the web portions of the side rails 21. Here, an example is illustrated in which the two frame-side brackets 6 are provided to each of the left and the right sides (i.e., the outside in the vehicle width direction D2 of each side rail 21) of the electric truck 3 (four frame-side brackets 6 in total).

[1-2. Configuration of Main Parts]

The battery-side bracket 5 includes the device mounting unit 9 which mounts an on-board device 10 on the outer face 52. The device mounting unit 9 is a portion to which the on-board device 10 is mounted and has a structure capable of mounting the on-board device 10.

The device mounting unit 9 is set at a part of at least the outer face 52 of the battery-side bracket 5. The present embodiment illustrates two device mounting units 9 set in areas including portions of the left and the right outer faces 52. However, the specific positions of and the number of device mounting units 9 are not limited to the example of the present embodiment.

Figure 3:
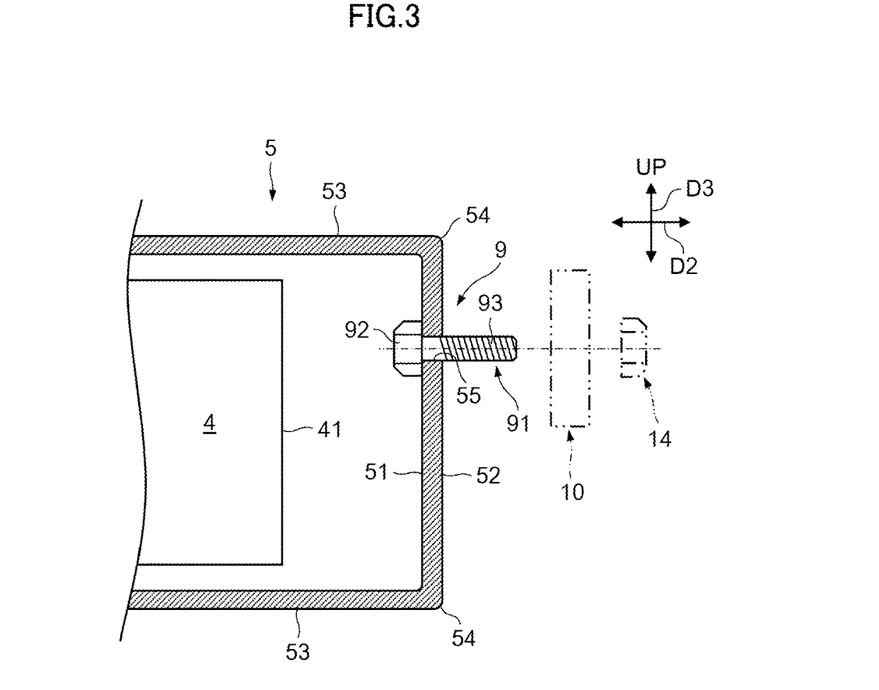
FIG. 3 is a sectional diagram schematically showing an example of a device mounting unit of the support apparatus of FIG. 1.
Figure 4:
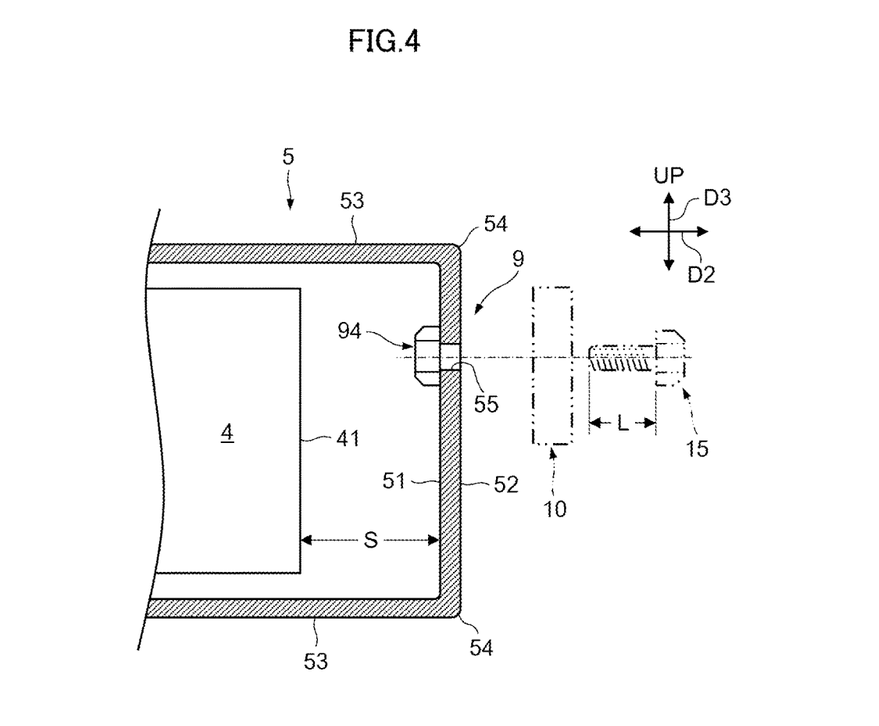
FIG. 4 is a sectional diagram schematically showing another example of the device mounting unit of the support apparatus of FIG. 1.

As shown in FIGS. 3 and 4, each device mounting unit 9 may include a weld bolt 91 and/or a weld nut 94 for installing the on-board device 10 to the outer face 52 of the battery-side bracket 5.

As shown in FIG. 3, the weld bolt 91 has a head portion 92 welded to the opposing face 51 and a screw portion 93 protruding outward in the vehicle width direction D2 from the head portion 92 further than the outer face 52. In detail, the weld bolt 91 is fixed to the opposing face 51 in a state where the screw portion 93 thereof is inserted into a hole portion 55, which penetrates a portion (in the present embodiment the web portion 71 of the end cross member 7) between the opposing face 51 and the outer face 52 of the battery-side bracket 5, from inside in the vehicle width direction D2.

The screw portion 93 of the weld bolt 91 is fastened to a nut 14 after being inserted into a through-hole (not shown) formed on the on-board device 10 (or its bracket, for example). This installs the on-board device 10 to the device mounting unit 9 including the weld bolt 91.

As shown in FIG. 4, the weld nut 94 is welded to the opposing face 51. More specifically, the weld nut 94 is fixed to the opposing face 51 while being positioned coaxially with the hole portion 55.

The weld nut 94 is fastened to a bolt 15 inserted from the outside of the vehicle width direction D2 to a through-hole (not shown) formed on the on-board device 10 (or the bracket thereof, for example). This installs the on-board device 10 to the device mounting unit 9 including the weld nut 94. Incidentally, the bolt 15 which is fastened to the weld nut 94 is set to have the length size L of the screw portion to be sufficiently shorter than the distance (gap) S between the battery side-face 41 and the opposing face 51 (L<S) in order to avoid interference with the battery pack 4.

The method of mounting the on-board device 10 on the device mounting unit 9 is not limited to the above method using the weld bolt 91 and the weld nut 94, and various known methods can be applied. Alternatively, the on-board device 10 may be mounted on the device mounting unit 9 by a conventional bolt or nut (not shown) that are not welded to the opposing face 51. Further alternatively, the on-board device 10 may be welded directly to the device mounting unit 9.

Figure 5:
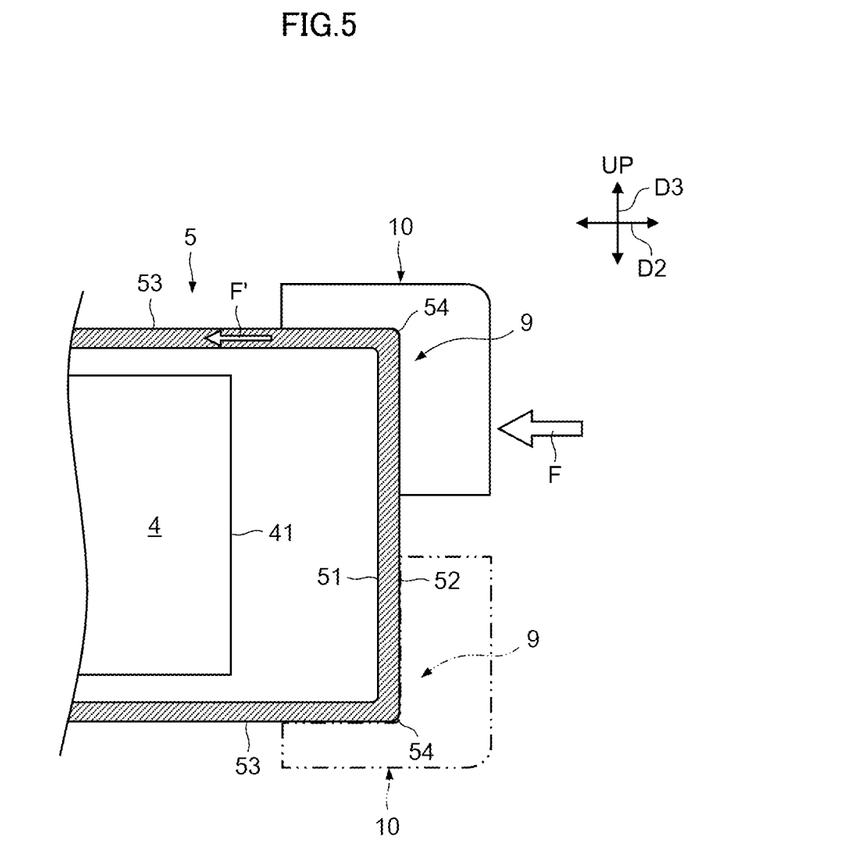
FIG. 5 is a sectional diagram schematically showing the structure and the effect of the device mounting unit of the support apparatus of FIG. 1.

As shown in FIG. 5, the device mounting unit 9 of the present embodiment is provided on the corner portion 54 that spans from the outer face 52 to the successive face 53 of the battery-side bracket 5. In other words, the device mounting unit 9 is set over a part of the outer face 52 and a part of the successive face 53. Here, the device mounting unit 9 provided on the upper corner portion 54 is illustrated.

The on-board device 10 (or its brackets, for example) mounted on the device mounting unit 9 provided on the corner portion 54 is arranged on the outer side of the corner portion 54 so as to cover the corner portion 54. In FIG. 5, the specific structure of the device mounting unit 9 (i.e., the weld bolt 91 and/or the weld nut 94, for example) is omitted and the on-board device 10 is simplified.

As shown in FIG. 1, the on-board device 10 of the present embodiment includes: a casing 12 provided with a charging opening 11 for charging the battery pack 4 from outside; and a sensor 13 that detects an object being outside in the vehicle width direction D2. Here, the example is assumed that the casing 12 is mounted on the right device mounting unit 9 and the sensor 13 is mounted on the left device mounting unit 9. Both the casing 12 and the sensor 13 are provided so as to protrude outward in the vehicle width direction D2 further than the outer face 52 of the battery-side bracket 5.

The casing 12, which is also referred to as a Charge Inlet Box (CIB), is provided at a predetermined position where the charging opening 11 can be accessed from the outside of the electric truck 3. In the casing 12, the charging opening 11 is disposed facing outward in the vehicle width direction D2.

An example of the sensor 13 is a radar or camera applied to a technique (so-called blind spot assist) of detecting an object existing in a blind spot of the electric truck 3 and inform the driver of the detected object. The sensor 13 is disposed at a predetermined position where the blind spot can be the detection range.

[2. Actions and Effects]

(1) According to the support apparatus 1, since the device mounting unit 9 that mounts the on-board device 10 is provided on the outer face 52 of the battery-side bracket 5, the impact load F input from the outside in the vehicle width direction D2 in the event of a side collision is input into the on-board device 10 before being input into the battery-side bracket 5, as shown in FIG. 5. This allows the initial input of the impact load F to be absorbed at the on-board device 10 before being absorbed at the battery-side bracket 5. Consequently, since it is possible to reduce the impact load F to be transmitted to the battery-side bracket 5, the impact load F to be transmitted to the battery pack 4 through the battery-side bracket 5 can also be reduced. Therefore, the protectability of the battery pack 4 can be enhanced in case of a side collision.

Further, in the electric truck 3, the battery pack 4 is mounted under the side rails 21 and the battery-side faces 41 are positioned on outsides in the vehicle width direction D2 of the side rail 21, the capacity of the battery pack 4 can be increased. On the other hand, since the battery pack 4 protrudes outward in the vehicle width direction D2 of the side rails 21, the mountability of the on-board device 10 onto the side rails 21 may be lowered. In contrast, according to the above device mounting unit 9, since the on-board device 10 is mounted on the outer face 52 of the battery-side bracket 5, the mountability of on-board device 10 can be ensured.

(2) As shown in FIG. 3, according to the device mounting unit 9 including the weld bolt 91, the on-board device 10 can be mounted on the device mounting unit 9 only by fastening the nut 14 to the weld bolt 91 from the outside in the vehicle width direction D2. Therefore, the mountability of the on-board device 10 can be further enhanced.

Furthermore, since the screw portion 93, which protrudes outward in the vehicle width direction D2 further than the outer face 52 from the head portion 92 welded to the opposing face 51, has a protruding end pointing outward in the vehicle width direction D2, the screw portion 93 can avoid interference with the battery pack 4. Therefore, even if the weld bolt 91 is displaced to the inside (toward the battery pack 4) in the vehicle width direction D2 in the event of a side collision, the screw portion 93 of the weld bolt 91 and the battery pack 4 can be prevented from being brought into contact with each other. Consequently, the protectability of the battery pack 4 can be further enhanced in the event of a side collision.

(3) As shown in FIG. 4, according to the device mounting unit 9 including the weld nut 94, simply fastening the bolt 15 to the weld nut 94 from the outside in the vehicle width direction D2 makes it possible to mount the on-board device 10 on the device mounting unit 9. Therefore, the mountability of the on-board device 10 can be further enhanced.

Further, under the state where the length size L of the screw portion of the bolt 15 to be fastened to the weld nut 94 is set to be sufficiently shorter than the distance S between the battery side-face 41 and the opposing face 51, even if the bolt 15 is displaced inward in the vehicle width direction D2 (toward the battery pack 4) in the event of a side collision, the contact of the bolt 15 with the battery pack 4 can be easily avoided. Therefore, the protectability of the battery pack 4 in the event of a side collision can be ensured.

(4) As shown in FIG. 5, according to the device mounting unit 9 formed on the corner portion 54 provided from the outer face 52 to the successive face 53 of the battery-side bracket 5, the on-board device 10 can be mounted on the corner portion 54, which has a relatively high rigidity in the battery-side bracket 5. Therefore, while simplifying the structure to install the on-board device 10 on the device mounting unit 9, it is possible to secure the installing strength of the on-board device 10 to the device mounting unit 9. For example, it is possible to stably fix the on-board device 10 to the device mounting unit 9 even with a limited number of bolts for mounting the on-board device 10 to the device mounting unit 9.

Further, according to the device mounting unit 9 provided to the corner portion 54 described above, since the on-board device 10 is mounted also on the successive face 53, the impact load F inputted into the on-board device 10 in the event of a side collision is easily transmitted to the successive face 53 as well as to the outer face 52. Since this structure makes it possible to transmit the impact load F to the vehicle width direction D2 through the successive face 52 (see Arrow F' in FIG. 5), the frame-side bracket 6 and the side rails 21 on the side opposite to the collision side of the battery-side bracket 5 (e.g. on the left side in the event of a right side collision) can efficiently absorb the impact load F. Consequently, since the deformation of the outer face 52 on the collision side in the battery-side bracket 5 (e.g., the outer face 52 on the right side in the event of a right side collision) is suppressed, and thus, the protectability of the battery pack 4 can be further enhanced in the event of a side collision.

(5) According to the electric truck 3 including the support apparatus 1, the mountability of the on-board device 10 can be ensured and also the protectability of the battery pack 4 in the event of a side collision can be enhanced.

(6) As shown in FIG. 1, according to the electric truck 3 in which the casing 12 provided with the charging opening 11 is mounted on the device mounting unit 9, the charging opening 11 can be easily disposed on the outer side in the vehicle width direction D2 as compared with a case where the casing 12 is mounted on the side rail 21. Thus, even without extending the dedicated bracket for arranging the casing 12 at a predetermined position from side rail 21, it is possible to arrange casing 12 at the predetermined position. Accordingly, the workability of supplying electricity to the charging opening 11 can be ensured while reducing the number of components and simplifying the structure.

(7) According to the electric truck 3 in which the sensor 13 that detects an object being outside in the vehicle width direction D2 is mounted on the device mounting unit 9, the sensor 13 can be easily disposed on the outer side in the vehicle width direction D2 as compared with a case where the sensor 13 is mounted on the side rail 21. This makes it possible to arrange the sensor 13 at a predetermined position without extending a dedicated bracket for arranging the sensor 13 at the predetermined position from the side rail 21. Accordingly, the detection area of the sensor 13 can be appropriately set while reducing the number of components and simplifying the structure.

[3. Modification]

The configuration of the battery-side bracket 5 described above is exemplary. The battery-side bracket 5 satisfactorily has the opposing face 51 facing the battery side-face 41 and has a shape capable of accommodating the battery pack 4.

The battery-side bracket 5 may be formed of components different from the end cross members 7 and the main members 8 described above.

The configuration, the arrangement, and the number of frame-side brackets 6 are not limited to the above example.

As shown by the two-dot chain line in FIG. 5, the device mounting unit 9 may be provided on the lower corner portion 54 among the upper and lower corner portions 54. The on-board device 10 (or its brackets, for example) mounted on such a device mounting unit 9 is arranged on the outer side of the lower corner portion 54 so as to cover the lower corner portion 54. Even with this configuration, since the on-board device 10 can be mounted on the corner portion 54, which has a relatively high rigidity in the battery-side bracket 5 like the above embodiment, it is possible to secure the installing strength of the on-board device 10 to the device mounting unit 9, while simplifying the structure to mount the on-board device 10 on the device mounting unit 9.

The specific structure of the device mounting unit 9 is not limited to the above examples. The device mounting unit 9 may include both a weld bolt 91 and a weld nut 94, or may include a structure except for the weld bolt 91 and a weld nut 94.

The on-board device 10 mounted on the device mounting unit 9 is not limited to the above casing 12 and the sensor 13, and may alternatively be various devices mounted on the electric truck 3. For example, on-board device 10 may include a low-voltage battery (not shown) for accessories of the electric truck 3. Even in cases where the on-board device 10 includes such a low-voltage battery, the support apparatus 1 and the electric truck 3 can ensure the mountability of the on-board device 10 while enhancing the protectability of the battery pack 4 in the event of a side collision, like the above embodiment.

The application of the support apparatus 1 is not limited to the above electric truck 3. The support apparatus 1 is applicable to a variety of vehicles having a ladder frame 2.

EXPLANATION OF REFERENCE SIGNS

1 Support apparatus (Support apparatus for a battery pack)
2 Ladder frame
3 Electric truck (Vehicle)
4 Battery pack
5 Battery-side bracket
6 Frame-side bracket
7 End cross member
8 Main member
9: Device mounting unit
10 On-board device
11 Charging opening
12 Casing
13 Sensor
14 Nut
15 Bolt
21 Side rail
22 Cross member
31 Front wheel
32 Rear wheel
41 Battery side-face
42 Front face
43 Rear face
51 Opposing face
52 Outer face
53 Successive face 54 Corner portion
55 Hole portion
71 Web portion
72 Flange portion
81 Web portion
82 Flange portion
91 Weld bolt
92 Head portion
93 Screw portion
94 Weld nut
F, F' Impact load
L Length size of the screw portion of bolt 15
S Distance (gap) between the battery side-face 41 and the opposing face 51

The invention claimed is:

1. A support apparatus for a battery pack being mounted under side rails constituting a ladder frame of a vehicle and including a pair of side faces, the side faces facing outward in a vehicle width direction, the support apparatus comprising:
- a battery-side bracket that includes an opposing face facing the side face and accommodates the battery pack; and
- a frame-side bracket coupling the battery-side bracket to the side rail;
- wherein the battery-side bracket comprises a device mounting unit for mounting an on-board device at an outer face opposite to the opposing face.

2. The support apparatus according to claim 1, wherein the device mounting unit comprises a weld bolt having a head portion being welded to the opposing face and a screw portion protruding from the head portion outward in the vehicle width direction further than the outer face.

3. The support apparatus according to claim 1, wherein the device mounting unit comprises a weld nut welded to the opposing face.

4. The support apparatus according to claim 1, wherein:
- the battery-side bracket comprises a successive face being provided successively to the outer face and forming a corner portion in conjunction with the outer face; and
- the device mounting unit is formed on the corner portion provided from the outer face to the successive face.

5. The support apparatus according to claim 1, wherein:
- the side faces are positioned on outsides in the vehicle width direction with respect to the side rails.

6. An electric truck, comprising:
- the support apparatus according to claim 1.

7. The electric truck according to claim 6, wherein the on-board device comprises a casing provided with a charging opening for charging the battery pack from outside.

8. The electric truck according to claim 6, wherein the on-board device comprises a sensor that detects an object being outside in the vehicle width direction.

* * * * *